United States Patent
Chinsoga et al.

(10) Patent No.: US 10,385,465 B2
(45) Date of Patent: Aug. 20, 2019

(54) PRODUCTION METHOD FOR ION EXCHANGE MEMBRANE FOR ALKALI CHLORIDE ELECTROLYSIS, AND PRODUCTION METHOD FOR ALKALI CHLORIDE ELECTROLYSIS APPARATUS

(71) Applicant: AGC Inc., Chiyoda-ku (JP)

(72) Inventors: Tamaki Chinsoga, Chiyoda-ku (JP); Takuo Nishio, Chiyoda-ku (JP); Yasushi Yamaki, Chiyoda-ku (JP); Takayuki Kaneko, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/908,999

(22) Filed: Mar. 1, 2018

(65) Prior Publication Data

US 2018/0237925 A1    Aug. 23, 2018

Related U.S. Application Data (63) Continuation of application No. PCT/JP2016/076489, filed on Sep. 8, 2016.

(30) Foreign Application Priority Data

Sep. 8, 2015   (JP) ................................ 2015-176814

(51) Int. Cl.
   *C25B 1/46* (2006.01)
   *C08J 5/22* (2006.01)
   (Continued)

(52) U.S. Cl.
   CPC .............. *C25B 1/46* (2013.01); *C08F 214/26* (2013.01); *C08J 5/22* (2013.01); *C08J 5/225* (2013.01);
   (Continued)

(58) Field of Classification Search
   CPC .... C25B 1/46; C25B 9/08; C25B 9/18; C25B 13/08; C08J 5/2225; C08J 5/225; C08J 5/22; C08J 2327/24; C08F 214/26
   See application file for complete search history.

(56) References Cited

U.S. PATENT DOCUMENTS

| 5,128,014 A | 7/1992 | Banerjee | |
|---|---|---|---|
| 2014/0073709 A1* | 3/2014 | Hattori | ................ C08F 6/06 521/27 |
| 2014/0360868 A1 | 12/2014 | Yamaki et al. | |

FOREIGN PATENT DOCUMENTS

| CN | 1993409 A | 7/2007 |
|---|---|---|
| JP | 58-181883 | 10/1983 |

(Continued)

OTHER PUBLICATIONS

English Translation of International Search Report dated Nov. 8, 2016 in PCT/JP2016/076489, filed Sep. 8, 2016.

*Primary Examiner* — Arun S Phasge
(74) *Attorney, Agent, or Firm* — Oblon, McClelland, Maier & Neustadt, L.L.P.

(57) ABSTRACT

To provide a method capable of efficiently producing an ion exchange membrane for alkali chloride electrolysis which has high current efficiency, little variation in current efficiency and high alkaline resistance. This is a method for producing an ion exchange membrane 1 having a layer (C) 12 containing a fluorinated polymer (A) having carboxylic acid type functional groups, by immersing an ion exchange membrane precursor film having a precursor layer (C') containing a fluorinated polymer (A') having groups convertible to carboxylic acid type functional groups, in an aqueous alkaline solution comprising an alkali metal hydroxide, a water-soluble organic solvent and water, wherein the proportion of structural units having carboxylic acid type functional groups in the fluorinated polymer (A) is (Continued)

from 13.0 to 14.50 mol %; in the layer (C) 12, the value of resistivity is from $4.0 \times 10^3$ to $25.0 \times 10^3$ $\Omega \cdot cm$, and the variation in resistivity is at most $4.0 \times 10^3$ $\Omega \cdot cm$, and the concentration of the water-soluble organic solvent is from 1 to 60 mass % in the alkaline aqueous solution.

10 Claims, 2 Drawing Sheets

(51) Int. Cl.
  *C25B 13/08* (2006.01)
  *C08F 214/26* (2006.01)
  *C25B 9/18* (2006.01)
  *C25B 9/08* (2006.01)
(52) U.S. Cl.
  CPC .............. *C08J 5/2225* (2013.01); *C25B 9/08* (2013.01); *C25B 9/18* (2013.01); *C25B 13/08* (2013.01); *C08J 2327/24* (2013.01)

(56) References Cited

FOREIGN PATENT DOCUMENTS

| | | |
|---|---|---|
| JP | 5-112886 | 5/1993 |
| JP | 2004-188375 | 7/2004 |
| JP | 4329339 | 9/2009 |
| JP | 2013-163858 A | 8/2013 |
| WO | WO 2009/133902 A1 | 11/2009 |

\* cited by examiner

PRODUCTION METHOD FOR ION EXCHANGE MEMBRANE FOR ALKALI CHLORIDE ELECTROLYSIS, AND PRODUCTION METHOD FOR ALKALI CHLORIDE ELECTROLYSIS APPARATUS

TECHNICAL FIELD

The present invention relates to a production method for an ion exchange membrane for alkali chloride electrolysis, and a production method for an alkali chloride electrolysis apparatus.

BACKGROUND ART

In alkali chloride electrolysis to produce an alkali hydroxide and chlorine by electrolyzing an aqueous solution of an alkali chloride (such as sodium chloride, potassium chloride or lithium chloride), an ion exchange membrane having a layer made of a fluorinated polymer having carboxylic acid type functional groups on the cathode side and having a layer made of a fluorinated polymer having sulfonic acid type functional groups on the anode side, is used as a diaphragm.

Such an ion exchange membrane is produced, for example, by the following method.

A method for producing an ion exchange membrane having a layer containing a fluorinated polymer having carboxylic acid type functional groups and a layer containing a fluorinated polymer having sulfonic acid type functional groups, by immersing an ion exchange membrane precursor film having a precursor layer containing a fluorinated polymer having groups convertible to carboxylic acid type functional groups, and a precursor layer containing a fluorinated polymer having groups convertible to sulfonic acid type functional groups, in an alkaline aqueous solution comprising an alkali metal hydroxide, a water-soluble organic solvent and water, to subject the groups convertible to carboxylic acid type functional groups to hydrolysis treatment to convert them to carboxylic acid type functional groups, and to subject the groups convertible to sulfonic acid type functional groups to hydrolysis treatment to convert them to sulfonic acid type functional groups (see e.g. Patent Documents 1 and 2).

PRIOR ART DOCUMENTS

Patent Documents

Patent Document 1: Japanese Patent No. 4329339
Patent Document 2: WO2009/133902

DISCLOSURE OF INVENTION

Technical Problem

However, the following two problems are likely to occur in alkali chloride electrolysis using an ion exchange membrane obtained by the conventional production method for an ion exchange membrane.

Variation in current efficiency at the time of electrolyzing an alkali chloride tends to be large, and it is not possible to carry out alkali chloride electrolysis stably.

At the time of electrolyzing an alkali chloride, the current efficiency tends to decrease if the concentration of the alkali hydroxide to be produced increases, i.e. alkali resistance will be inadequate. If the current efficiency drops, substantial demerits will result such as an increase in electric power consumption rate, an increase in running costs due to an increase in frequency of membrane replacement, a decrease in chlorine quality due to an increase of oxygen concentration in chlorine to be produced, etc.

It is an object of the present invention to provide a production method for an ion exchange membrane for an alkali chloride electrolysis, capable of efficiently producing an ion exchange membrane which has high current efficiency, little variation in current efficiency and high alkali resistance, and a method for efficiently producing an alkali chloride electrolysis apparatus which has high current efficiency, little variation in current efficiency and high alkali resistance.

Solution to Problem

The present invention has the following embodiments.

[1] A production method for an ion exchange membrane for alkali chloride electrolysis, which is a method for producing an ion exchange membrane for alkali chloride electrolysis having a layer containing a fluorinated polymer having carboxylic acid type functional groups, by immersing an ion exchange membrane precursor film having a precursor layer containing a fluorinated polymer having groups convertible to carboxylic acid type functional groups, in an alkaline aqueous solution containing an alkali metal hydroxide, a water-soluble organic solvent and water, and subjecting the groups convertible to carboxylic acid type functional groups to hydrolysis treatment to convert them to carboxylic acid type functional groups, wherein the proportion of structural units having the carboxylic acid type functional groups in the fluorinated polymer having the carboxylic acid type functional groups, is from 13.10 to 14.50 mol %, in all structural units (100 mol %) in the fluorinated polymer having the carboxylic acid type functional groups, in the layer containing a fluorinated polymer having carboxylic acid type functional groups, the following value of resistivity is from $4.0 \times 10^3$ to $25.0 \times 10^3$ Ω·cm, and the following variation in resistivity is at most $4.0 \times 10^3$ Ω·cm, and the concentration of the water-soluble organic solvent is from 1 to 60 mass % in the alkaline aqueous solution (100 mass %):

Value of resistivity and variation in resistivity: Five points in the ion exchange membrane for alkali chloride electrolysis are randomly selected; at the respective points, the resistivity in the layer containing a fluorinated polymer having carboxylic acid type functional groups is measured; and the average value of the resistivity at the 5 points in the ion exchange membrane for alkali chloride electrolysis is taken as the value of the resistivity, and further, the value twice the standard deviation in the resistivity at the 5 points in the ion exchange membrane for alkali chloride electrolysis is taken as the variation in the resistivity.

[2] The production method for an ion exchange membrane for alkali chloride electrolysis according to [1], wherein the concentration of the water-soluble organic solvent is from 5 to 50 mass % in the alkaline aqueous solution (100 mass %).

[3] The production method for an ion exchange membrane for alkali chloride electrolysis according to [1] or [2], wherein the concentration of the alkali metal hydroxide is from 1 to 60 mass % in the alkaline aqueous solution (100 mass %).

[4] The production method for an ion exchange membrane for alkali chloride electrolysis according to any one of [1] to [3], wherein the concentration of the alkali metal hydroxide is from 5 to 50 mass % in the alkaline aqueous solution (100 mass %).

[5] The production method for an ion exchange membrane for alkali chloride electrolysis according to any one of [1] to [4], wherein the alkali metal hydroxide is sodium hydroxide or potassium hydroxide.

[6] The production method for an ion exchange membrane for alkali chloride electrolysis according to any one of [1] to [5], wherein the water-soluble organic solvent is at least one member selected from the group consisting of aprotic water-soluble organic solvents, alcohols and aminoalcohols.

[7] The production method for an ion exchange membrane for alkali chloride electrolysis according to [6], wherein the water-soluble organic solvent is at least one member selected from the group consisting of dimethyl sulfoxide, methyl alcohol, ethyl alcohol, propyl alcohol, 1-methoxy-2-propanol, triethanolamine, diethanolamine, isopropanolamine, triisopropanolamine, dimethylaminoethanol and diethylaminoethanol.

[8] The production method for an ion exchange membrane for alkali chloride electrolysis according to any one of [1] to [7], which is a method for producing an ion exchange membrane for alkali chloride electrolysis further having a layer containing a fluorinated polymer having sulfonic acid type functional groups, wherein the ion exchange membrane precursor film further has a precursor layer containing a fluorinated polymer having groups convertible to sulfonic acid type functional groups, the ion exchange membrane precursor film is immersed in the alkaline aqueous solution, and the groups convertible to carboxylic acid type functional groups are subjected to hydrolysis treatment and converted to carboxylic acid type functional groups, and at the same time, the groups convertible to sulfonic acid type functional groups are subjected to hydrolysis treatment and converted to sulfonic acid type functional groups.

[9]. The production method for an ion exchange membrane for alkali chloride electrolysis according to any one of [1] to [8], wherein the ion exchange membrane for alkali chloride electrolysis further has a layer comprising inorganic particles and a binder, on at least one outermost layer.

[10] A production method for an alkali chloride electrolysis apparatus, which comprises mounting an ion exchange membrane for alkali chloride electrolysis obtained by the production method for an ion exchange membrane for alkali chloride electrolysis as defined in any one of [1] to [9], in an electrolytic cell comprising a cathode and an anode, so as to partition the inside of the electrolytic cell into a cathode chamber on the cathode side and an anode chamber on the anode side.

Advantageous Effects of Invention

According to the production method for an ion exchange membrane for alkaline chloride electrolysis of the present invention, it is possible to efficiently produce an ion exchange membrane which has high current efficiency, little variation in current efficiency and high alkali resistance.

According to the production method for an alkali chloride electrolysis apparatus of the present invention, it is possible to efficiently produce an alkali chloride electrolysis apparatus which has high current efficiency, little variation in current efficiency and high alkali resistance.

DESCRIPTION OF EMBODIMENTS

The following definitions of terms apply throughout this specification including claims.

In this specification, a monomer represented by the formula (1) will be referred to as a monomer (1). Monomers represented by other formulae will be referred to in the same manner.

A "carboxylic acid type functional group" means a carboxylic acid group (—COOH) or a carboxylate (—COOM$^1$, wherein M$^1$ is an alkali metal or a quaternary ammonium).

A "sulfonic acid type functional group" means a sulfonic acid group (—SO$_3$H) or a sulfonate (—SO$_3$M$^2$, wherein M$^2$ is an alkali metal or a quaternary ammonium).

The "groups convertible to carboxylic acid type functional groups" means groups which can be converted to carboxylic acid type functional groups by a known treatment such as hydrolysis treatment or acid form conversion treatment.

The "groups convertible to sulfonic acid type functional groups" means groups which can be converted to sulfonic acid type functional groups by a known treatment such as hydrolysis treatment or acid form conversion treatment.

A "fluorinated polymer" means a polymer compound having fluorine atoms in the molecule.

A "perfluorocarbon polymer" means a polymer having all of hydrogen atoms bonded to carbon atoms in the polymer, substituted by fluorine atoms. Some of fluorine atoms in the perfluorocarbon polymer may be substituted by chlorine atoms or bromine atoms.

A "monomer" means a compound having a polymerization reactive carbon-carbon double bond.

The term "structural units" means units derived from a monomer and formed by polymerization of the monomer. Structural units may be units formed directly by a polymerization reaction of a monomer, or after forming a polymer having certain structural units, such structural units may be chemically changed to have part of the structural units converted to another structure.

The term "primary particles" means the smallest particles to be observed by a scanning electron microscope (SEM). Further, the term "secondary particles" means particles having primary particles agglomerated.

An "ion exchange membrane precursor film" is a film before being subjected to hydrolysis treatment, and means a film having a precursor layer containing a fluorinated polymer having groups convertible to carboxylic acid type functional groups. In the ion exchange membrane precursor film, carboxylic acid type functional groups in the ion exchange membrane are in the state of groups which can be converted to carboxylic acid type functional groups. Further, in a case where the ion exchange membrane has a layer containing a fluorinated polymer having sulfonic acid type functional groups, also such sulfonic acid type functional groups are in the state of groups which can be converted to sulfonic acid type functional groups.

The "precursor layer" means a layer made of a fluorinated polymer having groups convertible to carboxylic acid type functional groups. The precursor layer may contain a layer made of a fluorinated polymer having groups convertible to sulfonic acid type functional groups. In the precursor layer, the carboxylic acid type functional groups in the ion exchange membrane are in the state of groups which can be converted to carboxylic acid type functional groups, and sulfonic acid type functional groups are in the state of groups which can be converted to sulfonic acid type functional groups.

Ion Exchange Membrane for Alkali Chloride Electrolysis

The ion exchange membrane for alkali chloride electrolysis (hereinafter simply referred to also as the "ion exchange membrane") obtainable by the production method of the present invention, has a layer (hereinafter simply referred to also as a "layer (C)") containing a fluorinated polymer having carboxylic acid type functional groups (hereinafter simply referred to also as a "fluorinated polymer (A)").

The ion exchange membrane may further have a layer (hereinafter simply referred to also as a "layer (S)") containing a fluorinated polymer having sulfonic acid type functional groups (hereinafter simply referred to also as a "fluorinated polymer (B)").

The ion exchange membrane may further have a layer comprising inorganic particles and a binder (hereinafter simply referred to also as an "inorganic particle layer") on at least one outermost layer.

In the ion exchange membrane, a reinforcing material may be embedded between the layer (S) and the layer (C), in the layer (S), or in the layer (C).

Figure 1:
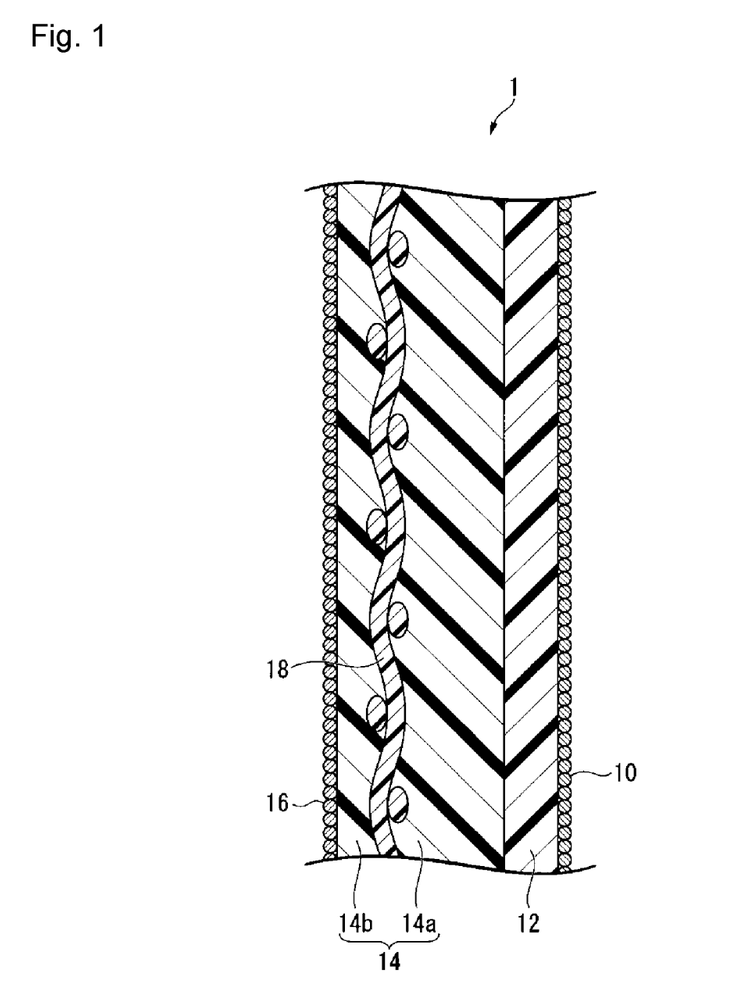
FIG. 1 is a schematic cross-sectional view showing an example of the ion exchange membrane for alkaline chloride electrolysis in the present invention.

FIG. 1 is a schematic cross-sectional view showing an example of the ion exchange membrane in the present invention.

The ion exchange membrane 1 has a first inorganic particle layer 10, a layer (C) 12 containing a fluorinated polymer (A), a layer (S) 14 containing a fluorinated polymer (B), and a second inorganic particle layer 16 in this order.

The layer (S) 14 may have a reinforcing material 18, and the reinforcing material 18 is embedded between a first layer (S1) 14a and a second layer (S2) 14b.

The ion exchange membrane 1 will be disposed so that, in an electrolytic cell, the first inorganic particle layer 10 faces the cathode, and the second inorganic particle layer 16 faces the anode.

The shape and size of the ion exchange membrane 1 may be suitably determined depending on an electrolytic cell in which the ion exchange membrane 1 is to be mounted.

(Layer (C))

The layer (C) containing a fluorinated polymer (A) expresses high current efficiency. The layer (C) may be a layer having a reinforcing material embedded therein. As the layer (C), from the viewpoint of the electrolytic performance, a layer composed solely of the fluorinated polymer (A) is preferred which does not contain a material other than the fluorinated polymer (A) such as a reinforcing material. The layer (C) may be single layered or multilayered. A multi-layered layer (C) may, for example, be one with such a construction that in the respective layers, the types of structural units constituting the fluorinated polymers (A) or the proportions of structural units having carboxylic acid type functional groups are different.

The fluorinated polymer (A) is one obtained by subjecting groups convertible to carboxylic acid type functional groups in a fluorinated polymer (hereinafter simply referred to also as a "fluorinated polymer (A')") having groups convertible to carboxylic acid type functional groups, to hydrolysis treatment to convert them to carboxylic acid type functional groups.

As the fluorinated polymer (A), preferred is a fluorinated polymer (hereinafter simply referred to also as a "fluorinated polymer (A1)") obtained by subjecting a fluorinated polymer (hereinafter simply referred to also as a "fluorinated polymer (A'1)") having structural units based on the following monomer (1) and structural units based on the following monomer (2) or monomers (2'), to hydrolysis treatment to convert Y to —COOM (wherein M is an alkali metal).

$CF_2\!=\!CX^1X^2$              (1)

$CF_2\!=\!CF(OCF_2CFX^3)_nO(CF_2)_mY$        (2)

$CF_2\!=\!CF(CF_2)_p\!-\!(O)_q\!-\!(CF_2CFX^4)_r\!-\!(O)_s\!-\!(CF_2)_t\!-\!(CF_2CFX^5)_u\!-\!Y$        (2')

$X^1$ and $X^2$ are each independently a fluorine atom, a chlorine atom or a trifluoromethyl group, and from the viewpoint of the chemical durability of the ion exchange membrane, a fluorine atom is preferred.

The monomer (1) may, for example, be $CF_2\!=\!CF_2$, $CF_2\!=\!CFCl$, $CF_2\!=\!CFCF_3$, etc., and from the viewpoint of chemical durability of the ion exchange membrane, $CF_2\!=\!CF_2$ is preferred.

$X^3$ is a fluorine atom or a trifluoromethyl group.

m is an integer of from 1 to 5.

n is 0 or 1.

$X^4$ is a fluorine atom or a trifluoromethyl group. $X^5$ is a fluorine atom or a trifluoromethyl group. In a case where both of $X^4$ and $X^5$ are present in one molecule, they may be the same or different.

p is 0 or 1, q is 0 or 1, r is an integer of from 0 to 3, s is 0 or 1, t is an integer from 0 to 12, u is an integer of from 0 to 3, and 1≤r+u.

Y is a group convertible to a carboxylic acid type functional group by hydrolysis. Y is preferably —COOR¹ (wherein R¹ is a $C_{1\text{-}4}$ alkyl group), —CN or —COX⁶ (wherein X⁶ is a halogen atom), more preferably —COOR¹, particularly preferably —COOCH₃.

As the monomer (2), for example, the following compounds may be mentioned, and from the viewpoint of ion selectivity of the ion exchange membrane, and industrial productivity of the monomer, a monomer wherein p=0, q=1, r=1, s=0 to 1, t=1 to 3 and u=0 to 1, is preferred, and a monomer represented by $CF_2\!=\!CF\!-\!O\!-\!CF_2CF_2\!-\!CF_2\!-\!COOCH_3$ is particularly preferred.

$CF_2\!=\!CFOCF_2CF(CF_3)OCF_2CF_2COOCH_3$,

$CF_2\!=\!CFOCF_2CF_2COOCH_3$, $CF_2\!=\!CFOCF_2CF_2CF_2COOCH_3$, $CF_2\!=\!CFOCF_2CF_2OCF_2CF_2COOCH_3$, $CF_2\!=\!CFOCF_2CF_2CF_2CF_2CF_2COOCH_3$, $CF_2\!=\!CFOCF_2CF(CF_3)OCF_2CF_2CF_2COOCH_3$.

The lower limit for the proportion of structural units having carboxylic acid type functional groups in the fluorinated polymer (A), is 13.10 mol %, preferably 13.15 mol %, more preferably 13.20 mol %, further preferably 13.25 mol %, among all structural units (100 mol %) in the fluorinated polymer (A). The upper limit for the proportion of structural units having carboxylic acid type functional groups in the fluorinated polymer (A), is 14.50 mol %, preferably 14.45 mol %, more preferably 14.40 mol %, further preferably 14.35 mol %, among all structural units (100 mol %) in the fluorinated polymer (A).

When the proportion of structural units having carboxylic acid type functional groups in the fluorinated polymer (A) is at least the lower limit value in the above range, it is possible to obtain an ion exchange membrane having high alkali resistance at the time of electrolyzing an alkali chloride. When the proportion of structural units having carboxylic acid type functional groups in the fluorinated polymer (A) is at most the upper limit value in the above range, it is possible to obtain an ion exchange membrane having high current efficiency at the time of electrolyzing an alkali chloride.

In order to bring the proportion of structural units having carboxylic acid type functional groups in the fluorinated polymer (A) to be within the above range, a fluorinated polymer (A') is employed which has groups convertible to carboxylic acid type functional groups in the same proportion as the proportion of structural units having carboxylic acid type functional groups in the fluorinated polymer (A).

A fluorinated polymer (A1) is obtainable by hydrolyzing a fluorinated polymer (A'1) obtained by copolymerizing the monomer (1) and the monomer (2). The polymerization method at the time of copolymerizing the monomer (1) and the monomer (2) is not particularly limited, and may be any of solution polymerization, emulsion polymerization, suspension polymerization, and bulk polymerization, but solution polymerization or emulsion polymerization is preferred, and solution polymerization is more preferred.

In the solution polymerization, the respective monomers may be charged all at once, or may be sequentially or continuously added and reacted. From the viewpoint of uniformizing the composition of the fluorinated polymer to be produced, it is preferred that the respective monomers are sequentially or continuously added to react them while controlling the concentrations of the respective monomers to be constant.

The fluorinated polymer (A) thus obtained by the solution polymerization tends to be uniform in the composition of the formed fluorinated polymer, as compared with other polymerization methods. With the fluorinated polymer (A) obtained by the solution polymerization, since the composition is uniform, and polymer molecules out of the optimum composition tend to be less, it becomes possible to express current efficiency stably under a wide operating region.

The thickness of the layer (C) is preferably from 5 to 50 µm, more preferably from 10 to 35 µm. When the thickness of the layer (C) is at least the lower limit value in the above range, it is possible to suppress concentration of an alkali chloride at the cathode side, which transmits from the anode side, and it is possible to maintain the quality of a an aqueous alkali hydroxide solution to be good as a product. When the thickness of the layer (C) is at most the upper limit value in the above range, the electric resistance of the ion exchange membrane tends to be low, whereby it is possible to lower the electrolytic voltage.

The present inventors have conducted an intensive study on the current efficiency and variation thereof at the time of electrolyzing an alkali chloride, and have found that by bringing the value of the resistivity of the layer (C) to be in the optimum range, the current efficiency at the time of electrolyzing an alkali chloride can be increased, and by decreasing variation of the resistivity of the layer (C), variation in current efficiency at the time of electrolyzing an alkali chloride can be reduced.

The lower limit value of the resistivity of the layer (C) is $4.0 \times 10^3$ Ω·cm, preferably $4.5 \times 10^3$ Ω·cm, more preferably $5.0 \times 10^3$ Ω·cm. The upper limit value of the resistivity of the layer (C) is $25.0 \times 10^3$ Ω·cm, preferably $18.0 \times 10^3$ Ω·cm, more preferably $16.0 \times 10^3$ Ω·cm.

The current efficiency of the ion exchange membrane tends to be low when the amount of movement of anions from the cathode side to the anode side is large, or when cations tend to hardly move from the anode side to the cathode side.

When the value of the resistivity of the layer (C) is in an optimum range, it is possible to prevent movement of anions to the anode side from the cathode side, whereby high current efficiency will be expressed. However, if the value of the resistivity becomes lower than the optimum range, anions will move from the cathode side to the anode side, whereby the current efficiency will decrease. On the other hand, when the value of the resistivity is higher than the optimum range, such will interfere with movement of cations from the anode side to the cathode side, whereby expression of current efficiency becomes unstable, and the current efficiency will decrease.

Variation of the resistivity of the layer (C) is at most $4.0 \times 10^3$ Ω·cm, preferably at most $3.8 \times 10^3$ Ω·cm, more preferably at most $3.6 \times 10^3$ Ωcm. When variation of the resistivity of the layer (C) is at most the above upper limit value, it is possible to obtain an ion exchange membrane having little variation in the current efficiency at the time of electrolyzing an alkali chloride. The lower the variation of the resistivity of the layer (C), the better, and the lower limit value is 0.

The value and variation of the resistivity of the layer (C) are obtained by the method as described in Examples. However, the apparatus used for the measurement may be replaced by a device having the same function.

Layer (S)

The layer (S) containing a fluorinated polymer (B) contributes to maintaining the mechanical strength of the ion exchange membrane. From the viewpoint of increasing the mechanical strength of the ion exchange membrane, it is preferred that a reinforcing material is embedded in the layer (S). In the case of embedding a reinforcing material, by embedding it in the layer (S) instead of in the layer (C), it is possible to obtain the reinforcing effect without affecting the electrolysis performance. The layer (S) may be single layered or multilayered. A multi-layered layer (S) may, for example, be one having such a construction that in the respective layers, the types of structural units constituting the fluorinated polymer (B) or the proportions of structural units having sulfonic acid type functional groups are different.

In the case of embedding a reinforcing material in the layer (S), it is preferred that the layer (S) is made to be multilayered, and a reinforcing material is inserted to one interlayer between such layers during the production, followed by lamination bonding to let the reinforcing material be embedded.

The fluorinated polymer (B) is one obtained by subjecting groups convertible to sulfonic acid type functional groups in a fluorinated polymer (hereinafter simply referred to also as a "fluorinated polymer (B')") having the groups convertible to sulfonic acid type functional groups, to hydrolysis treatment to convert them to sulfonic acid type functional groups.

As the fluorinated polymer (B), preferred is a fluorinated polymer (hereinafter simply referred to also as a "fluoropolymer (B1)") obtained by subjecting a fluorinated polymer (hereinafter simply referred to also as a "polymer (B'1)") having structural units based on the following monomer (1)

and structural units based on the following monomer (3), to hydrolysis treatment, to convert Z to —SO$_3$M (wherein M is an alkali metal).

$$CF_2=CX^1X^2 \quad (1)$$

$$CF_2=CF(OCF_2CFX^4)_sO(CF_2)_tZ \quad (3)$$

$X^1$ and $X^2$ are each independently a fluorine atom, a chlorine atom or a trifluoromethyl group, and from the viewpoint of chemical durability of the ion exchange membrane, a fluorine atom is preferred.

The monomer (1) may, for example, be $CF_2=CF_2$, $CF_2=CFCl$, $CF_2=CFCF_3$, etc., and from the viewpoint of chemical durability of the ion exchange membrane, $CF_2=CF_2$ is preferred.

$X^4$ is a fluorine atom or a trifluoromethyl group.

s is an integer of from 1 to 3.

t is an integer of from 0 to 3.

Z is a group which can be converted to a sulfonic acid functional group by hydrolysis. Z is preferably —SO$_2$X$^5$ (wherein X$^5$ is a fluorine atom, a chlorine atom or a bromine atom) or —SO$_2$R$^2$ (wherein R$^2$ is a C$_{1-4}$ alkyl group), more preferably —SO$_2$X$^5$, particularly preferably —SO$_2$F.

As the monomer (3), from the viewpoint of the strength intensity of the ion exchange membrane, and industrial productivity of the monomer, the following compounds are preferred.

$$CF_2=CFOCF_2CF(CF_3)OCF_2CF_2CF_2SO_2F,$$

$$CF_2=CFOCF_2CF(CF_3)OCF_2CF_2SO_2F,$$

$$CF_2=CFOCF_2CF_2CF_2SO_2F,$$

$$CF_2=CFOCF_2CF_2SO_2F.$$

The proportion of structural units having sulfonic acid type functional groups in the fluorinated polymer (B) is preferably from 13.10 to 30.50 mol %, more preferably from 15.00 to 18.00 mol %, among all structural units (100 mol %) in the fluorinated polymer (B).

When the proportion of structural units having sulfonic acid type functional groups in the fluorinated polymer (B) is at least the lower limit value in the above range, the electric resistance of the ion exchange membrane tends to be lower, whereby it is possible to lower the electrolytic voltage. When the proportion of structural units having sulfonic acid type functional groups in the fluorinated polymer (B) is at most the upper limit value in the above range, the synthesis of a fluoropolymer (B) with a high molecular weight will be easy, and it is possible to prevent swelling of the fluorinated polymer (B).

With a view to preventing peeling between the layer (C) and the layer (S), the difference between the proportion $X_C$ of structural units having carboxylic acid type functional groups in the fluorinated polymer (A) constituting the layer (C) adjacent to the layer (S) and the proportion $X_S$ of structural units having sulfonic acid type functional groups in the fluorinated polymer (B) constituting the layer (S) adjacent to the layer (C), is preferably small.

In the case of embedding a reinforcing material in the layer (S), it is preferred to make the layer (S) to be multilayer as shown in FIG. 1 and embed a reinforcing material in between the layers. In this case, from such a viewpoint that it is easy to reduce the electrolysis voltage, the proportion $X_{S2}$ of structural units having sulfonic acid type functional groups in the fluorinated polymer (B) constituting the second layer (S2) (14b in FIG. 1) on the anode side of the reinforcing material, is preferably equal to or higher than the proportion $X_{S1}$ of structural units having sulfonic acid type functional groups in the fluorinated polymer (B) constituting the first layer (S1) (14a in FIG. 1) on the cathode side of the reinforcing material.

In a case where the layer (S) is made to be multilayer, the fluorinated polymers (B) forming the respective layers may be the same or different.

The thickness of the layer (S) is preferably from 55 to 200 μm, more preferably from 70 to 160 μm. When the thickness of the layer (S) is at least the lower limit value in the above range, the mechanical strength of the ion exchange membrane will be sufficient so as to be durable against long-term electrolysis. When the total thickness of the layer (S) is at most the upper limit value in the above range, it is possible to sufficiently lower the electrolysis voltage.

In the case of embedding a reinforcing material in the layer (S), the thickness of the second layer (S2) on the anode side of the reinforcing material is preferably from 10 to 60 μm. When the thickness of the second layer (S2) is at least the lower limit value in the above range, the reinforcing material can easily be embedded in the layer (S) and interlayer peeling can be suppressed. When the thickness of the second layer (S2) is at most the upper limit value in the above range, the electric resistance of the ion exchange membrane tends to be low, whereby the electrolytic voltage can be made low.

In the case of embedding a reinforcing material in the layer (S), the thickness of the first layer (S1) on the cathode side of the reinforcing material is preferably from 45 to 140 μm, more preferably from 60 to 100 μm.

Inorganic Particle Layer

The ion exchange membrane may have, on at least one outermost surface layer, an inorganic particle layer comprising inorganic particles (hereinafter referred to also as "inorganic particles (P)") and the binder.

By providing the inorganic particle layer on the outermost surface layer of the ion exchange membrane, it is possible to suppress adhesion of gas to the surface of the ion exchange membrane, whereby at the time of electrolyzing an alkali chloride solution, it is possible to suppress increase of the electrolytic voltage. Further, since the inorganic particle layer contains a binder, it is excellent in falling resistance of inorganic particles (P), whereby inorganic particles (P) are less likely to fall off, even if friction has occurred with other members, etc., and the effect to suppress adhesion of gas can be stably obtained.

The inorganic particles (P) are preferably ones which are excellent in corrosion resistance to the alkali chloride aqueous solution, etc., and which have hydrophilic properties. Specifically, preferred is at least one member selected from the group consisting of oxides, nitrides and carbides of Group 4 elements and Group 14 elements in the periodic table, more preferred is $SiO_2$, SiC, $ZrO_2$ or ZrC, and particularly preferred is $ZrO_2$.

The average primary particle diameter of the inorganic particles (P) is preferably from 0.01 to 1 μm, more preferably from 0.02 to 0.4 μm. When the average primary particle diameter of the inorganic particles (P) is at least the lower limit value in the above range, unevenness due to aggregation will be less. When the average primary particle diameter of the inorganic particles (P) is at most the upper limit value in the above range, unevenness due to poor dispersion will be less.

The average secondary particle diameter of the inorganic particles (P) is preferably from 0.5 to 1.5 μm, more preferably from 0.7 to 1.3 μm. When the average secondary particle diameter of the inorganic particles (P) is at least the lower limit value in the above range, a high gas adhesion suppressing effect will be obtained. When the average secondary particle diameter of the inorganic particles (P) is at most the upper limit value in the above range, falling resistance of inorganic particles (P) will be excellent.

As the binder contained in the inorganic particle layer (hereinafter referred to also as a "first inorganic particle layer") provided on the layer (C) side surface of the ion exchange membrane, preferred is one which is excellent in corrosion resistance to the alkali hydroxide aqueous solution, etc. and which has hydrophilic properties, more preferred is a fluorinated polymer (H) having carboxylic acid groups or sulfonic acid groups, and further preferred is a fluorinated polymer (H) having sulfonic acid groups. The fluorinated polymer (H) may be a homopolymer of a monomer having a carboxylic acid group or sulfonic acid group, or a copolymer of a monomer having a carboxylic acid group or sulfonic acid group and a monomer copolymerizable therewith.

As the fluorinated polymer (H) having carboxylic acid groups, a polymer obtained by subjecting a copolymer having structural units based on the monomer (1) and structural units based on the monomer (2) to hydrolysis treatment, followed by acid form conversion treatment to convert Y to —COOH, may be mentioned.

As the fluorinated polymer (H) having sulfonic acid groups, a polymer obtained by subjecting a copolymer having structural units based on the monomer (1) and structural units based on the monomer (3) to hydrolysis treatment, followed by acid form conversion treatment to convert Z to —SO$_3$H, may be mentioned.

The mass ratio of the binder (hereinafter referred to also as the "binder ratio") to the total mass of the inorganic particles (P) and the binder in the first inorganic particle layer Is preferably from 0.15 to 0.30, more preferably from 0.15 to 0.25, further preferably from 0.16 to 0.20. When the binder ratio in the first inorganic particle layer is at least the lower limit value in the above range, falling resistance of the inorganic particles (P) will be excellent. When the binder ratio in the first inorganic particle layer is at most the upper limit value in the above range, a high gas adhesion suppressing effect will be obtainable.

As the inorganic particle layer to be provided on the layer (S) side surface of the ion exchange membrane (hereinafter referred to also as the "second inorganic particle layer"), a known hydrophilic layer (gas release layer) to be provided on the anode side of an ion exchange membrane for use in electrolysis of an alkali chloride aqueous solution, may be employed.

As the binder contained in the inorganic particle layer to be provided on the layer (S) side surface of the ion exchange membrane, a known binder for use in the known hydrophilic layer (gas release layer) to be provided on the anode side, may be employed, and, for example, methylcellulose, etc. may be mentioned. The binder used in the inorganic particle layer provided on the layer (C) side surface of the ion exchange membrane may also be used.

Reinforcing Material

The reinforcing material is a material used to improve the strength of the ion exchange membrane, and is a material formed from a sacrificial yarn optionally contained and a reinforcing yarn derived from a reinforcing fabric formed by dissolution of at least a part of a sacrificial yarn in the reinforcing fabric by immersing an ion exchange membrane precursor film having a precursor layer containing a fluorinated polymer having the reinforcing fabric embedded therein in an alkaline aqueous solution in the process for the production of an ion exchange membrane. In a case where a part of a sacrificial yarn has been dissolved, the reinforcing material is a material composed of the reinforcing yarn and the sacrificial yarn remaining as undissolved, and in a case where all of the sacrificial yarn has been dissolved, it is composed solely of the reinforcing yarn. That is, the reinforcing material is a material formed from the reinforcing yarn and optionally contained sacrificial yarn. The reinforcing material is embedded in the ion exchange membrane, and may be formed by immersing a precursor film made of a fluorinated polymer having a reinforcing fabric embedded therein, in an aqueous alkaline solution.

The reinforcing fabric as a raw material for the reinforcing material is a fabric to be used as a raw material for the reinforcing material for improving the strength of an ion exchange membrane, and may, for example, be a woven fabric, a nonwoven fabric, fibril, a porous body, etc., and from the viewpoint of mechanical strength, a woven fabric is preferred. In a case where the reinforcing fabric is a woven fabric, such a woven fabric is preferably one having a reinforcing yarn and a sacrificial yarn woven. The reinforcing yarn and the sacrificial yarn in the reinforcing fabric are woven as warp and weft, respectively, and these warp and weft are orthogonal in the case of a usual weaving method such as plain weave. As the material for the reinforcing yarn, a fluorinated polymer such as polytetrafluoroethylene (hereinafter referred to also as PTFE) may be mentioned. As the material for the sacrificial yarn, polyethylene terephthalate (hereinafter referred to as PET) may be mentioned.

Current Efficiency of Ion Exchange Membrane

The current efficiency of the ion exchange membrane is preferably at least 96.0%. When the current efficiency of the ion exchange membrane is high, it is possible to efficiently electrolyze an alkali chloride.

The current efficiency of the ion exchange membrane is measured by the method described in Examples. However, the apparatus used for the measurement may be replaced by a device having the same function.

Production Method for Ion Exchange Membrane for Alkali Chloride Electrolysis

The production method for an ion exchange membrane of the present invention is a method for producing an ion exchange membrane having a layer (C) containing a fluorinated polymer (A) having carboxylic acid type functional groups, by immersing an ion exchange membrane precursor film having a precursor layer (C') containing a fluorinated polymer (A') having groups convertible to carboxylic acid type functional groups, in an alkaline aqueous solution containing an alkali metal hydroxide, a water-soluble organic solvent and water, and subjecting the groups convertible to carboxylic acid type functional groups to hydrolysis treatment to convert them to carboxylic acid type functional groups, wherein the proportion of structural units having the carboxylic acid type functional groups in the fluorinated polymer (A) is from 13.10 to 14.50 mol %, in all structural units (100 mol %) in the fluorinated polymer (A); in the layer (C), the value of the resistivity is from $4.0 \times 10^3$ to $25.0 \times 10^3$ Ω·cm; the variation of the resistivity in the layer (C) is at most $4.0 \times 10^3$ Ω·cm; and the concentration of the water-soluble organic solvent is from 1 to 60 mass % in the alkaline aqueous solution (100 mass %).

The production method for an ion exchange membrane of the present invention essentially requires the following step (b), and may have the following step (a), as the case requires.

Step (a): A step of obtaining an ion exchange membrane precursor film having a precursor layer (C') containing a fluorinated polymer (A').

Step (b): A step of immersing the ion exchange membrane precursor film obtained in step (a) in an alkaline aqueous solution containing an alkali metal hydroxide, a water-soluble organic solvent and water, and subjecting groups convertible to carboxylic acid type functional groups to hydrolysis treatment to convert them to the carboxylic acid type functional groups.

Step (a)

In the step (a), an ion exchange membrane precursor film having a precursor layer (C') containing a fluorinated polymer (A') is produced. The ion exchange membrane precursor film may further has a precursor layer (S') containing a fluorinated polymer (B'), as the case requires.

The ion exchange membrane precursor film may be produced by a known method using a fluorinated polymer (A'). In a case where it further has a precursor layer (S'), it may be produced by a known method using further a fluorinated polymer (B'). In a case where it further has a precursor layer (S'), or in a case where the precursor layer (C') or precursor layer (S') is multilayered, it can be produced by laminating the respective layers.

As the fluorinated polymer (A'), the above-mentioned fluorinated polymer (A'1) is preferred. As the fluorinated polymer (B'), the above-mentioned fluorinated polymer (B'1) is preferred.

As the fluorinated polymer (A'), one whereby the proportion of structural units having carboxylic acid type functional groups in a fluorinated polymer (A) obtainable after the hydrolysis treatment will be from 13.10 to 14.50 mol % among all structural units (100 mol %) in the fluorinated polymer (A), is employed. As the fluorinated polymer (A'), preferred is one whereby the proportion of structural units having carboxylic acid type functional groups in the fluorinated polymer (A) will be within the above range.

When the proportion of structural units having carboxylic acid type functional groups in the fluorinated polymer (A) obtainable after hydrolysis treatment, is at least the lower limit value in the above range, it is possible to obtain an ion exchange membrane having high alkali resistance at the time of electrolyzing an alkali chloride. When the proportion of structural units having carboxylic acid type functional groups in the fluorinated polymer (A) obtainable after hydrolysis treatment is at most the upper limit value in the above range, it is possible to obtain an ion exchange membrane having high current efficiency at the time of electrolyzing an alkali chloride.

Step (b)

In step (b), the ion exchange membrane precursor film is immersed in an alkaline aqueous solution containing an alkali metal hydroxide, a water-soluble organic solvent and water, to subject groups convertible to carboxylic acid type functional groups to hydrolysis treatment to convert them to the carboxylic acid type functional groups. In a case where the ion exchange membrane precursor film further has a precursor layer (S'), at the same time as converting groups convertible to carboxylic acid type functional groups to the carboxylic acid type functional groups, groups convertible to sulfonic acid type functional groups are subjected to hydrolysis treatment to convert them to the sulfonic acid type functional groups.

The concentration of the water-soluble organic solvent is from 1 to 60 mass %, preferably from 3 to 55 mass %, more preferably from 5 to 50 mass %, in the alkaline aqueous solution (100 mass %). If the concentration of the water-soluble organic solvent is less than the lower limit value, the hydrolysis treatment speed will be low, whereby the productivity will be low. If the concentration of the water-soluble organic solvent exceeds the upper limit value, the polymer tends to be excessively swelled, the resistivity of the polymer will be low, the water content will increase, and the current efficiency will decrease due to the aforementioned mechanism.

The concentration of the alkali metal hydroxide is preferably from 1 to 60 mass %, more preferably from 3 to 55 mass %, further preferably from 5 to 50 mass %, in the alkaline aqueous solution (100 mass %). When the concentration of the alkali metal hydroxide is within the above range, the hydrolysis treatment will swiftly proceed.

The concentration of water is preferably from 39 to 80 mass %, more preferably from 45 to 70 mass %, in the alkaline aqueous solution (100 mass %).

The temperature of the alkaline aqueous solution in which the ion exchange membrane precursor film is to be immersed, is preferably at least 40° C. and less than 80° C., more preferably from 42 to 78° C., further preferably from 44 to 76° C. When the temperature of the alkaline aqueous solution is at least the lower limit value in the above range, the electrolysis voltage will be suppressed to be low, and the hydrolysis treatment will be swiftly completed, whereby the productivity of the ion exchange membrane will be improved. When the temperature of the alkaline aqueous solution is at most the upper limit value in the above range, it is possible to obtain an ion exchange membrane having high current efficiency and little variation in current efficiency at the time of electrolyzing an alkali chloride.

When the temperature of the alkaline aqueous solution is at least the lower limit value in the above range, the electrolysis voltage will be suppressed to be low, and the hydrolysis treatment will be swiftly completed, whereby the productivity of the ion exchange membrane will be improved. When the temperature of the alkaline aqueous solution is at most the upper limit value in the above range, it is possible to obtain an ion exchange membrane which has high current efficiency and little variation in current efficiency at the time of electrolyzing an alkali chloride.

The time for immersing the ion exchange membrane precursor film in an alkaline aqueous solution is preferably from 5 minutes to 3 hours, more preferably within 2 hours, further preferably within 1 hour.

As the alkali metal hydroxide, sodium hydroxide or potassium hydroxide is preferred, and potassium hydroxide is more preferred. As the alkali metal hydroxide, one type may be used alone, or two or more types may be used in combination.

The water-soluble organic solvent may, for example, be an aprotic water-soluble organic solvent (dimethyl sulfoxide, etc.), an alkyl alcohol (methyl alcohol, ethyl alcohol, propyl alcohol, etc.), an alkoxy alcohol (1-methoxy-2-propanol, 1-ethoxy 2-propanol, 1-methoxy-2-methyl-2-propanol, 1-propoxy-2-propanol, 1-isopropoxy-2-propanol, 2-ethoxy-1-propanol, 2,3-ethoxy-1-propanol, 2-methoxy-1-propanol, 1-butoxy-2-propanol, etc.), an aryloxy alcohol (2-phenoxy-1-propanol), or an amino alcohol (triethanolamine, diethanolamine, isopropanolamine, triisopropanolamine, dimethylaminoethanol, diethylaminoethanol, etc.). Here, in the exemplification of the alkoxy alcohol or the aryloxy alcohol, a solvent having its propanol portion replaced by another alcohol (such as ethanol, butanol, etc.) may also be mentioned as a preferred solvent.

As the water-soluble organic solvent, with a view to swelling the ion exchange membrane and promoting the hydrolysis reaction rate, at least one member selected from the group consisting of the aprotic water-soluble organic solvent, the alcohol and the amino alcohol, is preferred, at least one member selected from the group consisting of dimethyl sulfoxide, methyl alcohol, ethyl alcohol, propyl alcohol, 1-methoxy-2-propanol, triethanolamine, diethanolamine, isopropanolamine, triisopropanolamine, dimethylaminoethanol and diethylaminoethanol, is more preferred, and 1-methoxy-2-propanol or dimethyl sulfoxide is further preferred. As the water-soluble organic solvent, one type may be used alone, or two or more types may be used in combination.

The alkaline aqueous solution is required only to contain water, an alkali metal hydroxide and a water-soluble organic solvent, and it may be uniform or non-uniformly phase separated at the temperature for the hydrolysis, but is preferably uniformly compatibilized.

In order to bring the value of the resistivity of the layer (C) to be formed by hydrolysis treatment in step (b) to be in the above-mentioned range, the composition of the alkaline aqueous solution to be used for the hydrolysis, the hydrolysis temperature, and the proportion of structural units having carboxylic acid type functional groups, may be adjusted. For example, in order to bring the content of the functional groups to be high and to bring the water content and resistivity to be low, adjustment may be made by reducing the amount of the organic solvent or by lowering the temperature for the hydrolysis.

In order to bring variation of the resistivity of the layer (C) to be formed by hydrolysis treatment in step (b) to be at most the upper limit value in the above-mentioned range, the temperature of the alkaline aqueous solution in which the ion exchange membrane precursor film is immersed, may be made to be at most the upper limit value in the above-mentioned range.

It is known that the water content in the ion exchange membrane may be changed by changing the temperature of the alkaline aqueous solution in which the ion exchange membrane precursor film is immersed (hereinafter referred to also as the hydrolysis temperature). By bringing the hydrolysis temperature to be at most the upper limit value in the above-mentioned range, variation in the water content will be reduced, as described later in the advantageous effects. The water content is highly correlated with the resistivity, and by reducing variation in the water content, variation in the resistivity will also be reduced.

In order to efficiently produce an ion exchange membrane for alkali chloride electrolysis, which has high current efficiency, less variation in current efficiency and high alkali-resistance, the composition of the alkaline aqueous solution to be used for hydrolysis, and the proportion of structural units having carboxylic acid type functional groups, may be adjusted, and preferably, also the temperature for hydrolysis should better be adjusted. For example, as compared with one having a low functional group content, a polymer having a high functional group content tends to have a high water content, and low resistivity, and therefore, adjustment may be made by reducing the amount of the organic solvent, and preferably by further lowering the temperature for hydrolysis.

Thus, by controlling the adjustment factors to correspond to the above-described ranges, it is possible to efficiently produce an ion exchange membrane for alkaline chloride electrolysis which has high current efficiency and alkali resistance at the time of electrolyzing an alkali chloride.

Method for Forming Inorganic Particle Layer

In a case where the ion exchange membrane precursor film further contains an inorganic particle layer, such an inorganic particle layer may be formed by applying a coating solution (hereinafter referred to also as a "coating solution (D)") comprising inorganic particles (P), a binder and a dispersion medium, to the surface of the layer (C) or layer (S) of an ion exchange membrane, or the layer (C') or layer (S') of an ion exchange membrane precursor film, followed by removing the dispersion medium by e.g. heating, for drying.

Otherwise, the inorganic particle layer may be formed by applying a past-form coating liquid (D) comprising inorganic particles (P), a binder and a dispersion medium, to a transfer substrate to form an inorganic particle layer, which is then transferred to the surface of the layer (C) or layer (S) of an ion exchange membrane, or the layer (C') or layer (S') of an ion-exchange membrane precursor film.

As the preparation method for the coating liquid (D), preferred is a method of mixing inorganic particles (P), a binder and a dispersion medium, and stirring them by means of a ball mill to be uniform, followed by dispersion treatment by means of a bead mill. By using such a method, it is easy to control the average secondary particle diameter of inorganic particles (P) to be within the aforementioned range.

The average secondary particle diameter of inorganic particles (P) in the coating liquid (D) can be controlled by adjusting the average primary particle diameter of inorganic particles (P), the treating time for dispersion treatment, etc.

As the dispersion medium, in a case where the binder is a fluorinated polymer (H) having sulfonic acid groups, an alcohol solvent (ethanol, isopropyl alcohol, etc.) is preferred.

Further, as the dispersion medium, an aprotic polar solvent such as dimethyl sulfoxide, formamide, N,N-dimethylacetamide, or N,N-dimethylformamide, may be used. As the aprotic polar solvent, preferred is one having a boiling point of at least 140° C. and at most the melting point of the fluorinated polymer (A) and the fluorinated polymer (B), and a melting point of at most 25° C.

In the case of using an aprotic polar solvent, a coating liquid (D) having the aprotic polar solvent incorporated, may be prepared and applied, or a coating liquid (D) using a dispersion medium (such as an alcohol type solvent) other than an aprotic polar solvent may be prepared and applied, and then, the aprotic polar solvent may be applied.

The content of the dispersion medium in the coating liquid (D) (100 mass %) is preferably from 30 to 95 mass %, more preferably from 70 to 90 mass %. When the content of the dispersion medium is within the above range, the dispersibility of the binder will be good, and the viscosity will also be proper, such being suitable for the case of applying the coating liquid (D) by a spray method.

In a case where an aprotic polar solvent is to be used, the content of the aprotic polar solvent in the coating liquid (D) (100 mass %) is preferably from 1 to 70 mass %, more preferably from 10 to 50 mass %.

As a method for applying the coating liquid (D), a known coating method may be employed, and, for example, a spray method, a roll coater method, etc. may be mentioned, but a spray method is preferred. In a case where prior to step (b), a later-described step (c) is to be carried out, from such a viewpoint that adhesion of the coating solution (D) becomes better, a spray method is preferred, and it is particularly preferred to reduce the amount of air in the spray method.

The heating method for removing the dispersion medium may, for example, be a method of using a heating roll, a method of using an oven, etc., and industrially, a method for conducting heat treatment continuously by a roll press machine having a heated roll is preferred.

In the case of using a roll press, the pressure to be applied is preferably a linear pressure of at most 0.2 MPa from the viewpoint of reduction of the power.

The heating temperature for removing the dispersion medium is preferably at least 30° C., more preferably at least the boiling point of the dispersion medium to be used. If the heating temperature is lower than the boiling point of the dispersion medium, the dispersing medium is likely to remain on the surface of the ion exchange membrane, but depending on the type of the dispersion medium, even by heating at a temperature of lower than the boiling point, the dispersion medium can be sufficiently volatilized, from the relationship of the vapor pressure.

Further, the heating temperature is preferably less than the melting point of the fluorinated polymer (A) and the fluorinated polymer (B). Thus, it becomes easy to prevent the film thickness from becoming uneven.

One Embodiment of Production Method for Ion Exchange Membrane

Now, an example for an embodiment of the production method for an ion exchange membrane of the present invention will be described with reference to an example of the ion exchange membrane 1 in FIG. 1.

The ion exchange membranes 1 can be produced, for example, by a method having the following steps (a) to (c).

Step (a): A step of obtaining a second inorganic particle layer-attached ion exchange membrane precursor film, which has a second inorganic particle layer 16, a second precursor layer (S'2) containing a fluorinated polymer (B'), a reinforcing fabric, a first precursor layer (S'1) containing a fluorinated polymer (B') and a precursor layer (C') containing a fluorinated polymer (A') in this order.

Step (b): A step of immersing the second inorganic particle layer-attached ion exchange membrane precursor film, in an alkaline aqueous solution comprising water, potassium hydroxide and dimethyl sulfoxide, subjecting groups convertible to carboxylic acid type functional groups and groups convertible to sulfonic acid type functional groups to hydrolysis treatment to convert them to carboxylic acid type functional groups and sulfonic acid functional groups, and at the same time, dissolving at least part of sacrificial yarns in the reinforcing fabric, to obtain a composite film which has the second inorganic particle layer 16, a second layer (S2) 14b, the reinforcing material 18, a first layer (S1) 14a and a layer (C) 12 in this order.

Step (c): A step of applying a coating liquid comprising inorganic particles (P), a binder and a dispersing medium on the surface of the layer (C) 12 of the composite film to form a first inorganic particle layer 10, to obtain an ion exchange membrane 1.

In the following, the above steps (a) to (c) will be described in more detail.

Step (a)

As the method for obtaining an ion exchange membrane precursor film, for example, a method having the following means (i) to (iv) may be mentioned. However, as the fluorinated polymer (A'), one whereby the proportion of structural units having carboxylic acid type functional groups in a fluorinated polymer (A) obtainable after hydrolysis treatment will be in the above-mentioned range, is to be employed.

(i) A means to obtain a laminate film having a layer (C') of a fluorinated polymer (A') and a layer of a fluorinated polymer (B') laminated by means of a film die for co-extrusion.

(ii) A means to obtain a single-layer film of a fluorinated polymer (B') by means of a film die for monolayer extrusion.

(iii) A means to obtain an ion exchange membrane precursor film by overlaying on the fluorinated polymer (B') layer side of the laminate film, a reinforcing fabric and a single layer film in this order, and heat pressing them.

(iv) A step of applying a paste having inorganic particles dispersed in a dispersion medium (such as an aqueous solution of methyl cellulose) to a transfer substrate to form an inorganic particle layer, which is then transferred on the layer (S') side of the ion exchange membrane precursor film, to form a second inorganic particle layer 16.

Step (b)

The ion exchange membrane precursor film is immersed in the alkaline aqueous solution, to subject the groups convertible to carboxylic acid type functional groups and the groups convertible to sulfonic acid type functional groups to hydrolysis treatment to convert them to carboxylic acid type functional groups and sulfonic acid type functional groups, and at the same time, at least part of the sacrificial yarns in the reinforcing fabric embedded in the ion exchange membrane precursor film is dissolved to form a reinforcing material, to obtain a composite film. Here, the composition and temperature of the alkaline aqueous solution are within the above-mentioned ranges.

Step (c)

The coating liquid (D) comprising inorganic particles (P), a binder and a dispersion medium is applied to the surface of the layer (C) 12 in the composite film. Thereafter, the dispersion medium is removed by e.g. heating to form a first inorganic particle layer 10, to obtain an ion exchange membrane 1.

Other Embodiments of Production Method for Ion Exchange Membrane

The production method for an ion exchange membrane 1 is not limited to the above-described embodiment.

For example, it may be a method of conducting step (c) prior to step (b).

Further, in a case where in step (a), the fluorinated polymer (A) and the fluorinated polymer (B) are employed, step (b) may not be carried out.

Further, it may be a method in which on the surface of the layer (C) of the laminated film of the layer (C) and the layer (S), the first inorganic particle layer is formed by the coating liquid (D), and then, the second inorganic particle layer is laminated on the surface of the layer (S).

Further, it may be a method in which the second inorganic particle layer is formed by applying the coating liquid (D) in the same manner as for the first inorganic particle layer.

In the production method for an ion exchange membrane of the present invention, a fluorinated polymer (A') is used whereby the proportion of structural units having carboxylic acid type functional groups in a fluorinated polymer (A) obtainable after hydrolysis treatment will be within the above-mentioned range, the value and variation of the resistivity of the layer (C) are within the above-mentioned ranges, and the concentration of the water-soluble organic solvent in the alkaline aqueous solution is within the above-mentioned range, whereby it is possible to efficiently produce an ion exchange membrane which has high current efficiency, little variation in current efficiency and high alkali resistance.

The present inventors have found that variation in current efficiency at the time of electrolyzing an alkali chloride, is caused by variation in the resistivity in the layer (C).

As the cause for variation in the resistivity in the layer (C), variation in the temperature or liquid composition of the alkaline aqueous solution in the reaction system at the time of hydrolyzing groups convertible to carboxylic acid type functional groups in the ion exchange membrane precursor film, is considered to be a cause. Such variation is, of course, likely to occur between lots, but may occur even within the same lot.

As a result of an intensive study, the present inventors have found it possible to suppress variation in the resistivity in the layer (C) by adjusting the temperature for the hydrolysis or the liquid composition. For example, by lowering the temperature, or by making the liquid composition for hydrolysis to a state where the polymer is less likely to be swelled, the hydrolysis tends to proceed relatively slowly, the swelling degree of the layer (C) tends to be constant, and the resistivity of the layer (C) tends to be small. For stabilization of the current efficiency, it is very important that variation in the resistivity of the layer (C) is small, and by reducing the resistivity of the layer (C), it is possible to constantly produce an ion exchange membrane which has little variation in current efficiency.

Production Method for Alkali Chloride Electrolysis Apparatus

The production method for an alkali chloride electrolysis apparatus of the present invention is a method which comprises obtaining an ion exchange membrane by the production method for an ion exchange membrane of the present invention, and mounting the ion exchange membrane in an electrolytic cell, so as to partition the inside of the electrolytic cell comprising a cathode and an anode into a cathode chamber on the cathode side and an anode chamber on the anode side.

Figure 2:
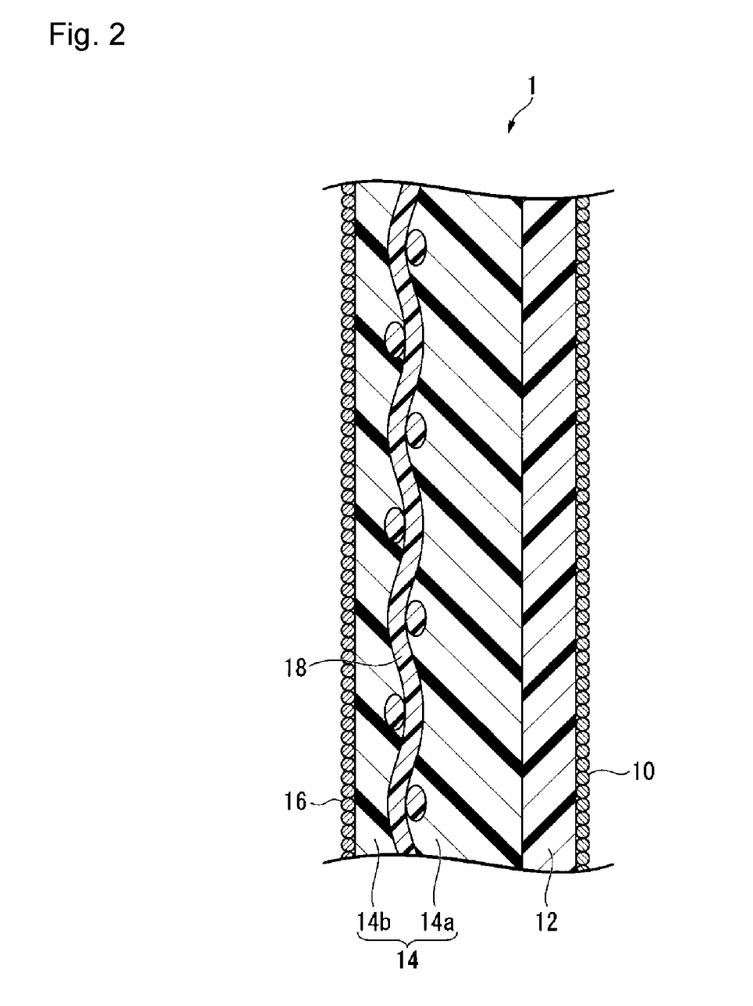
FIG. 2 is a schematic diagram showing an example of the alkali chloride electrolysis apparatus in the present invention.

FIG. 2 is a schematic diagram showing an example of the alkali chloride electrolysis apparatus of the present invention.

The alkali chloride electrolysis apparatus 100 has an electrolytic cell 110 comprising a cathode 112 and anode 114, and an ion exchange membrane 1 mounted in the electrolytic cell 110 so as to partition the inside of the electrolytic cell 110 into a cathode chamber 116 on the cathode 112 side and an anode chamber 118 on the anode 114 side.

The Ion exchange membrane 1 is mounted in the electrolytic cell 110 so that the layer (C) 12 will be on the cathode 112 side, and the layer (S) 14 will be on the anode 114 side.

The cathode 112 may be placed in contact with the ion exchange membrane 1, or may be placed with a space from the ion exchange membrane 1.

The material constituting the cathode chamber 116 is preferably a material which is resistant to sodium hydroxide and hydrogen. As such a material, stainless steel, nickel, etc. may be mentioned.

The material constituting the anode chamber 118 is preferably a material which is resistant to sodium chloride and chlorine. As such a material, titanium may be mentioned.

Production Method for Aqueous Sodium Hydroxide Solution

For example, in the case of producing an aqueous sodium hydroxide solution by electrolyzing an aqueous sodium chloride solution, an aqueous sodium chloride solution 119 is supplied to the anode chamber 118 of the alkali chloride electrolysis apparatus 100; water or an aqueous sodium hydroxide solution 121 is supplied to the cathode chamber 116, and the aqueous sodium chloride solution is electrolyzed while keeping the concentration of the aqueous sodium hydroxide solution 122 discharged from the cathode chamber 116 at a predetermined concentration (e.g. 32 mass %).

The concentration of an aqueous sodium chloride solution 120 discharged from the anode chamber 118 is preferably from 150 to 200 g/L.

The concentration of the aqueous sodium hydroxide solution discharged from the cathode chamber 116 is preferably from 20 to 40 mass %.

The temperature in the electrolytic cell 110 is preferably from 50 to 120° C.

The current density is preferably from 1 to 6 kA/m$^2$.

Other Embodiments of Alkali Chloride Electrolysis Apparatus

The alkali chloride electrolysis apparatus in the present invention may be one provided with an ion exchange membrane obtained by the production method for an ion exchange membrane of the present invention, as a diaphragm, and constructions other than the diaphragm may be known ones.

The electrolytic cell may be a monopolar type wherein a cathode chamber and an anode chamber are alternately arranged with the ion exchange membrane interposed, so that the cathode chambers one another and the anode chambers one another are electrically in parallel, or a bipolar type wherein the back of a cathode chamber and the back of an anode chamber are electrically connected, so that the respective chambers are electrically in series.

Since the production method for an alkali chloride electrolysis apparatus of the present invention comprises obtaining an ion exchange membrane by the production method for an ion exchange membrane of the present invention, and then, mounting the ion exchange membrane as a diaphragm in an electrolytic cell, it is possible to efficiently produce an alkaline chloride electrolysis apparatus which has high current efficiency, little variation in current efficiency and high alkali resistance.

EXAMPLES

Now, the present invention will be described in detail with reference to Examples, but the present invention is not limited thereto.

Ex. 1 to 8 are Examples of the present invention, and Ex. 9 to 16 are Comparative Examples.

Measurement of the Proportion of Structural Units Having Functional Groups in each Polymer About 0.5 g of a fluorinated polymer (A') or fluorinated polymer (B') was melted and molded into a film form by flat plate pressing, and this film sample was analyzed by a transmission infrared spectrometer, whereby using the respective peak heights of $CF_2$ peak, $CF_3$ peak and OH peak of the obtained spectrum, the proportion of structural units having groups convertible to carboxylic acid type functional groups in the fluorinated polymer (A') or having groups convertible to sulfonic acid type functional groups in the fluorinated polymer (B'), was calculated. This calculated value was adopted as the proportion of structural units having carboxylic acid type functional groups in the fluorinated polymer (A) or having sulfonic acid type functional groups in the fluorinated polymer (B), obtainable after hydrolysis treatment.

Measurement of Resistivity of Layer (C)

The resistivity of the layer (C) was obtained as follows.

First, the thickness t (cm) of the layer (C) of the dried ion exchange membrane was measured. In a case where the ion exchange membrane had an inorganic particle layer on the outermost layer, the inorganic layer was wiped off and removed. The ion exchange membrane immersed in a 25 mass % sodium hydroxide aqueous solution was heated at 90° C. for 16 hours and returned to 25° C. The ion exchange membrane was put in a resistance measurement cell having an effective area of 1.77 cm² and inserted between two platinum black electrodes, whereupon inside of the cell was controlled to be 25° C. by gently pouring a 25 mass % sodium hydroxide aqueous solution into the cell. To platinum terminals connected to the electrodes, a digital multimeter ZM2353 (manufactured by NF Circuit Design Block Co., Ltd.) was connected to let an alternating current of 1000 Hz flow.

In a case where the ion exchange membrane did not have a layer other than the layer (C), with respect to the ion exchange membrane, the membrane resistance $R_M$ ($\Omega$) inclusive of the liquid resistance was measured. In that state, the ion exchange membrane was gently withdrawn from the cell, and the liquid resistance $R_E$ ($\Omega$) was measured. The resistivity R ($\Omega \cdot$cm) was obtained by the following formula.

$$R = (R_M - R_E) \times 1.77/t$$

In a case where the ion exchange membrane had a layer other than the layer (C), with respect to the ion exchange membrane, the membrane resistance $R_{M1}$ ($\Omega$) inclusive of the liquid resistance, and the liquid resistance $R_{E1}$ ($\Omega$), were measured in the same manner, and then, the layer (C) was peeled from the ion exchange membrane to obtain a membrane having no layer (C) layer. With respect to the membrane having no layer (C) immersed in a 25 mass % sodium hydroxide aqueous solution, the membrane resistance $R_{M2}$ ($\Omega$) inclusive of the liquid resistance, and the liquid resistance $R_{E2}$ ($\Omega$), were measured in the same manner. The resistivity R' ($\Omega \cdot$cm) of the layer (C) was obtained by the following formula.

$$R' = \{(R_{M1} - R_{E1}) - (R_{M2} - R_{E2})\} \times 1.77/t$$

The value and variation of the resistivity of the layer (C) were obtained as follows.

Five points in the ion exchange membrane were randomly selected, and respectively, resistivities in the layer (C) were obtained. The average value of the resistivities at the five points in the ion exchange membrane, was adopted as the value of the resistivity. Further, the value twice the standard deviation of the resistivities at the five points in the ion exchange membrane was adopted as the variation.

The 5 points selected for obtaining the value and variation of the resistivity are randomly selected points in the ion exchange membrane. In the case of selecting them from the same plane of a sheet of the ion exchange membrane, the measuring points are selected preferably at a rate of one point per 0.01 m², more preferably at a rate of one point per 0.02 m², further preferably at the rate of one point per 0.5 m², particularly preferably at a rate of one point per 1.0 m². In the case of measuring them among separate ion exchange membranes, it is preferred to select one point from each of five ion exchange membranes produced under the same conditions. In Examples and Comparative Examples, the 5 points were selected at a rate of one point per 0.02 m² from the same plane of one ion exchange membrane.

Alkali Chloride Electrolysis Apparatus

Used as an electrolytic cell (effective current area: 25 cm²) was one wherein an inlet of feed water to a cathode chamber was disposed at a lower portion of the cathode chamber; an outlet of the aqueous sodium hydroxide solution to be formed, was disposed at an upper portion of the cathode chamber; an inlet of an aqueous sodium chloride solution to an anode chamber was disposed at a lower portion of the anode chamber, and an outlet of the aqueous sodium chloride solution diluted by the reaction was disposed at the top of the anode chamber.

As the anode, a punched metal made of titanium (short diameter: 4 mm, long diameter: 8 mm) coated with a solid solution of ruthenium oxide, iridium oxide and titanium oxide, was used.

As the cathode, a punched metal of SUS304 (short diameter: 5 mm, long diameter: 10 mm) having ruthenium-containing Raney nickel electrodeposited thereon, was used.

Current Efficiency and Measurement of Variation in Current Efficiency

The ion exchange membrane was mounted, so as to partition the inside of the electrolytic cell into a cathode chamber on the cathode side and an anode chamber on the anode side, and the first inorganic particle layer of the ion exchange membrane faced the cathode, and the second inorganic particle layer of the ion exchange membrane faced the anode.

Electrolysis was conducted for one week under conditions of a temperature of 90° C. and a current density of 6 kA/m², while keeping the cathode side in a pressurized state so as to contact the anode and the ion exchange membrane, supplying 290 g/L of an aqueous sodium chloride solution and water, respectively, to the anode chamber and the cathode chamber, maintaining the sodium chloride concentration discharged from the anode chamber to be 200 g/L, and maintaining the sodium hydroxide concentration discharged from the cathode chamber to be 32 mass %, and the current efficiency after one week was measured. Further, for variation in current efficiency, the current efficiencies of five ion exchange membranes produced under the same conditions, were measured, and twice the value of their standard deviation was adopted as the value of variation.

Measurement of Alkali Resistance

In an electrolytic cell, the ion exchange membrane was mounted, so as to partition the inside of the electrolytic cell into a cathode chamber on the cathode side, and an anode chamber on the anode side, and the first inorganic particle layer of the ion exchange membrane faced to the cathode and the second inorganic particle layer of the ion exchange membrane faced the anode.

Electrolysis was conducted for at least 3 days under conditions of a temperature of 90° C. and a current density of 6 kA/m$^2$, while keeping the cathode side in a pressurized state so as to contact the anode and the ion exchange membrane, supplying 290 g/L of an aqueous sodium chloride solution and water, respectively, to the anode chamber and the cathode chamber, maintaining the sodium chloride concentration discharged from the anode chamber to be 200 g/L, and maintaining the sodium hydroxide concentration discharged from the cathode chamber to be 32 mass %, and the current efficiency was measured.

Except that the concentration of sodium hydroxide discharged from the cathode chamber was changed to 4 points of the concentration of sodium hydroxide by increasing the concentration from 32 mass % to 40 mass % by 2% intervals, electrolysis was conducted in the same manner as the above method at each concentration of sodium hydroxide, and the current efficiency was measured at each concentration of sodium hydroxide.

A graph was prepared by taking the current efficiency on the ordinate and the sodium hydroxide concentration on the abscissa, and plotting the respective points of to the sodium hydroxide concentration and the current efficiency measured as described above. Two points i.e. a point where the current efficiency exceeds 94% and is closest to 94%, and a point where the current efficiency is less than 94% and is closest to 94%, were connected by a straight line, and on the straight line, the sodium hydroxide concentration when the current efficiency is 94%, was calculated, and the value of the sodium hydroxide concentration was taken as the concentration for alkali resistance. In a case where the current efficiency at any point was 94%, that point was taken as the concentration for alkali resistance.

Fluorinated Polymer (A'1)

$CF_2$=$CF_2$ and $CF_2$=$CFOCF_2CF_2CF_2COOCH_3$ were copolymerized to obtain fluorinated polymers (A'1-1) to (A'1-6). The proportion of structural units having carboxylic acid type functional groups in the fluorinated polymer (A) obtained after hydrolysis treatment is shown in Table 1.

Fluorinated Polymer (B1)

$CF_2$=$CF_2$ and $CF_2$=$CFOCF_2CF(CF_3)OCF_2CF_2SO_2F$ were copolymerized to obtain a fluorinated polymer (B'1-1) (the proportion of structural units having sulfonic acid type functional groups in the fluorinated polymer (B) obtainable after hydrolysis treatment: 15.29 mol %).

$CF_2$=$CF_2$ and $CF_2$=$CFOCF_2CF(CF_3)OCF_2CF_2SO_2F$ were copolymerized to obtain a fluorinated polymer (B'1-2) (the proportion of structural units having sulfonic acid type functional groups in the fluorinated polymer (B) obtainable after hydrolysis treatment: 17.76 mol %).

Ex. 1

Step (a)

Using an apparatus equipped with two extruders, a film die for co-extrusion and a take-off machine, a laminated film (1) having a layer (C') with a thickness of 12 µm consisting of the fluorinated polymer (A'1-1), and a layer of the fluorinated polymer (B'1-1) with a thickness of 68 µm, laminated, was obtained.

Using a film die for monolayer extrusion, a single layer film (2) of the fluorinated polymer (B'1-1) with a thickness of 30 µm was obtained.

A reinforcing yarn of monofilament obtained by rapidly stretching a PTFE film and then slitting it in a thickness of 100 denier and a sacrificial yarn of multifilament of 30 denier obtained by aligning and twisting six PET filaments of 5 denier, were subjected to plain weaving in alternating sequences of two sacrificial yarns relative to one reinforcing yarn, to obtain a woven fabric for reinforcement (the density of reinforcing yarns: 10 yarns/cm, and the density of sacrificial yarns: 20 yarns/cm).

The single layer film (2), the woven fabric, the laminated film (1) and a release PET film (thickness: 100 µm) were, in this order and so that the layer (C') of the laminated film (1) would be on the release PET film side, passed through a pair of rolls, laminated and integrated. The release PET film was peeled off, to obtain an ion exchange membrane precursor film.

A paste comprising 29.0 mass % of zirconium oxide (average secondary particle diameter: 1 µm), 1.3 mass % of methyl cellulose, 4.6 mass % of cyclohexanol, 1.5 mass % of cyclohexane and 63.6 mass % of water, was transferred by a roll press to the layer (S') side of the ion exchange membrane precursor film, to attach a second inorganic particle layer. The attached amount of zirconium oxide at the membrane surface was 20 g/m$^2$.

Step (b)

The second inorganic particle layer-attached ion exchange membrane precursor film was immersed in an alkaline aqueous solution of dimethyl sulfoxide/potassium hydroxide/water=5.5/30/64.5 (mass ratio) at 75° C. and subjected to hydrolysis treatment to convert groups convertible to carboxylic acid type functional groups and groups convertible to sulfonic acid type functional groups, respectively, to carboxylic acid type functional groups (—COOK) and sulfonic acid type functional groups (—SO$_3$K), followed by drying to obtain an ion exchange composite membrane.

Step (c)

The fluorinated polymer (B'1-2) was subjected to hydrolysis treatment, followed by acid form conversion treatment to sulfonic acid groups (—SO$_3$H), and dissolved in ethanol, to prepare a 9.5 mass % ethanol solution. To the ethanol solution, 10.8 mass % of zirconium oxide (average primary particle diameter: 0.4 µm) was added as inorganic particles, and the binder ratio was adjusted to 0.25, to obtain a coating liquid (D) wherein the average secondary particle diameter of zirconium oxide was 1.3 μm.

On the surface of the layer (C) in the composite membrane, the coating solution (D) was applied by spraying, and the first inorganic particle layer was deposited to obtain an ion exchange membrane.

The carboxylic acid type functional groups and the sulfonic acid type functional groups in the ion exchange membrane were, respectively, converted from the potassium salt type to the sodium salt type, followed by evaluations of the ion exchange membrane. The results are shown in Table 1.

Ex. 2 to 16

An ion exchange membrane of a sodium salt type was obtained in the same manner as in Ex. 1 except that the type of the fluorinated polymer (A'1), the temperature of the alkaline aqueous solution used in step (b), the concentration of dimethyl sulfoxide and the concentration of potassium hydroxide were changed as shown in Table 1. Evaluations of the ion exchange membrane were conducted. The results are shown in Table 1.

current efficiency was low at the time of electrolyzing an alkali chloride by using the obtained ion exchange membrane.

In Ex. 13 wherein the proportion of structural units having carboxylic acid type functional groups in the fluorinated polymer (A) obtainable after hydrolysis treatment, was too low, alkali resistance was low at the time of electrolyzing an alkali chloride using the obtained ion exchange membrane.

In Ex. 14 and 16 wherein the proportion of structural units having carboxylic acid type functional groups in the fluorinated polymer (A) obtainable after hydrolysis treatment, was too high, current efficiency was low at the time of electrolyzing an alkali chloride by using the obtained ion exchange membrane.

In Ex. 15 wherein hydrolysis treatment was conducted by using the alkaline aqueous solution containing no dimethyl sulfoxide, it took at least 50 hours for the hydrolysis treatment, and it was not possible to efficiently produce an ion exchange membrane.

INDUSTRIAL APPLICABILITY

The ion exchange membrane obtainable by the production method of the present invention is useful as an ion exchange

TABLE 1

| Ex. | Type of fluorinated polymer (A'1) | Proportion of structural units having carboxylic acid type functional groups in fluorinated polymer (A) [mol %] | Alkaline aqueous solution | | | Time for hydrolysis treatment [hrs] | Resistivity of layer (C) [$10^3$ Ω·cm] | | Current efficiency [%] | Variation in current efficiency | Alkali resistance [mass %] |
|---|---|---|---|---|---|---|---|---|---|---|---|
| | | | Temperature [° C.] | DMSO concentration [mass %] | KOH concentration [mass %] | | Average value | Variation | | | |
| 1 | A'1-1 | 14.29 | 75 | 5.5 | 30 | <1 | 6.4 | 3.1 | 96.6 | 0.5 | >40 |
| 2 | A'1-1 | 14.29 | 55 | 5.5 | 30 | <3 | 7.6 | 2.7 | 96.8 | 0.4 | >40 |
| 3 | A'1-2 | 13.43 | 75 | 5.5 | 30 | <1 | 10.0 | 3.1 | 97.1 | 0.5 | 37.4 |
| 4 | A'1-2 | 13.43 | 55 | 5.5 | 30 | <3 | 12.0 | 2.7 | 97.3 | 0.4 | 37.2 |
| 5 | A'1-3 | 13.61 | 75 | 10 | 30 | <1 | 9.1 | 2.7 | 97.0 | 0.4 | 38.0 |
| 6 | A'1-3 | 13.61 | 55 | 10 | 30 | <1 | 10.9 | 2.4 | 97.2 | 0.3 | 37.8 |
| 7 | A'1-4 | 13.89 | 75 | 30 | 15 | <1 | 7.6 | 2.7 | 96.8 | 0.4 | 39.2 |
| 8 | A'1-4 | 13.89 | 55 | 30 | 15 | <1 | 10.0 | 2.4 | 97.1 | 0.3 | 39.0 |
| 9 | A'1-1 | 14.29 | 95 | 5.5 | 30 | <1 | 4.5 | 5.1 | 96.2 | 1.1 | >40 |
| 10 | A'1-2 | 13.43 | 95 | 5.5 | 30 | <1 | 7.6 | 5.1 | 96.8 | 1.1 | 37.6 |
| 11 | A'1-3 | 13.61 | 95 | 10 | 30 | <1 | 1.7 | — | 95.1 | — | — |
| 12 | A'1-4 | 13.89 | 95 | 30 | 15 | <1 | <0.3 | — | <93 | — | — |
| 13 | A'1-5 | 12.80 | 75 | 10 | 30 | <1 | 14.3 | 2.4 | 97.5 | 0.3 | <36 |
| 14 | A'1-6 | 15.68 | 75 | 10 | 30 | <1 | <0.3 | — | <93 | — | — |
| 15 | A'1-1 | 14.29 | 70 | — | 25 | >50 | — | — | — | — | — |
| 16 | A'1-7 | 14.56 | 95 | 5.5 | 95 | <1 | 2.4 | — | 95.5 | — | >40 |

DMSO: dimethylsulfoxide,
KOH: potassium hydroxide

In Ex. 1 to 8 wherein a fluoropolymer (A') was used whereby the proportion of structural units having carboxylic acid type functional groups in the fluorinated polymer (A) obtainable after hydrolysis treatment became to be within a specific range, and the average value and variation of the resistivity of the layer (C) were within specific ranges, current efficiency was high, variation in current efficiency was little, and alkali resistance was high, at the time of electrolyzing an alkali chloride by using the obtained ion exchange membrane.

On the other hand, in Ex. 9 and 10 wherein the variation of the resistivity of the layer (C) was large, variation in current efficiency became large at the time of electrolyzing an alkali chloride by using the obtained ion exchange membrane.

In Ex. 11 and 12 wherein the average value of the resistivity of the layer (C) was less than $4.0 \times 10^3$ Ω·cm, membrane to be used for electrolysis of an alkali chloride to electrolyze an aqueous alkali chloride solution to produce an alkali hydroxide and chlorine.

This application is a continuation of PCT Application No. PCT/JP2016/076489, filed on Sep. 8, 2016, which is based upon and claims the benefit of priority from Japanese Patent Application No. 2015-176814 filed on Sep. 8, 2015. The contents of those applications are incorporated herein by reference in their entireties.

REFERENCE SYMBOLS

1: ion exchange membrane, 10: first inorganic particle layer, 12: layers (C), 14: layer (S), 14a: first layer (S1), 14b: second layer (S2), 16: second inorganic particle layer, 18: reinforcing material, 100: alkali chloride electrolysis apparatus, 110: to electrolytic cell, 112: cathode, 114: anode, 116:

cathode chamber, 118: anode chamber, 119: NaCl aqueous solution, 120: dilute aqueous NaCl solution, 121: H$_2$O or aqueous NaOH solution, 122: aqueous NaOH solution.

What is claimed is:

1. A production method for an ion exchange membrane for alkali chloride electrolysis, which is a method for producing an ion exchange membrane for alkali chloride electrolysis having a layer containing a fluorinated polymer having carboxylic acid type functional groups, by immersing an ion exchange membrane precursor film having a precursor layer containing a fluorinated polymer having groups convertible to carboxylic acid type functional groups, in an alkaline aqueous solution containing an alkali metal hydroxide, a water-soluble organic solvent and water, and subjecting the groups convertible to carboxylic acid type functional groups to hydrolysis treatment to convert them to carboxylic acid type functional groups, wherein
- the proportion of structural units having the carboxylic acid type functional groups in the fluorinated polymer having the carboxylic acid type functional groups, is from 13.10 to 14.50 mol %, in all structural units (100 mol %) in the fluorinated polymer having the carboxylic acid type functional groups,
- in the layer containing a fluorinated polymer having carboxylic acid type functional groups, the following value of resistivity is from $4.0\times10^3$ to $25.0\times10^3$ $\Omega\cdot$cm, and the following variation in resistivity is at most $4.0\times10^3$ $\Omega\cdot$cm, and
- the concentration of the water-soluble organic solvent is from 1 to 60 mass % in the alkaline aqueous solution (100 mass %):
- Value of resistivity and variation in resistivity: Five points in the ion exchange membrane for alkali chloride electrolysis are randomly selected; at the respective points, the resistivity in the layer containing a fluorinated polymer having carboxylic acid type functional groups is measured; and the average value of the resistivity at the 5 points in the ion exchange membrane for alkali chloride electrolysis is taken as the value of the resistivity, and further, the value twice the standard deviation in the resistivity at the 5 points in the ion exchange membrane for alkali chloride electrolysis is taken as the variation in the resistivity.

2. The production method for an ion exchange membrane for alkali chloride electrolysis according to claim 1, wherein the concentration of the water-soluble organic solvent is from 5 to 50 mass % in the alkaline aqueous solution (100 mass %).

3. The production method for an ion exchange membrane for alkali chloride electrolysis according to claim 1, wherein the concentration of the alkali metal hydroxide is from 1 to 60 mass % in the alkaline aqueous solution (100 mass %).

4. The production method for an ion exchange membrane for alkali chloride electrolysis according to claim 1, wherein the concentration of the alkali metal hydroxide is from 5 to 50 mass % in the alkaline aqueous solution (100 mass %).

5. The production method for an ion exchange membrane for alkali chloride electrolysis according to claim 1, wherein the alkali metal hydroxide is sodium hydroxide or potassium hydroxide.

6. The production method for an ion exchange membrane for alkali chloride electrolysis according to claim 1, wherein the water-soluble organic solvent is at least one member selected from the group consisting of aprotic water-soluble organic solvents, alcohols and aminoalcohols.

7. The production method for an ion exchange membrane for alkali chloride electrolysis according to claim 6, wherein the water-soluble organic solvent is at least one member selected from the group consisting of dimethyl sulfoxide, methyl alcohol, ethyl alcohol, propyl alcohol, 1-methoxy-2-propanol, triethanolamine, diethanolamine, isopropanolamine, triisopropanolamine, dimethylaminoethanol and diethylaminoethanol.

8. The production method for an ion exchange membrane for alkali chloride electrolysis according to claim 1, which is a method for producing an ion exchange membrane for alkali chloride electrolysis further having a layer containing a fluorinated polymer having sulfonic acid type functional groups, wherein
- the ion exchange membrane precursor film further has a precursor layer containing a fluorinated polymer having groups convertible to sulfonic acid type functional groups,
- the ion exchange membrane precursor film is immersed in the alkaline aqueous solution, and the groups convertible to carboxylic acid type functional groups are subjected to hydrolysis treatment and converted to carboxylic acid type functional groups, and at the same time, the groups convertible to sulfonic acid type functional groups are subjected to hydrolysis treatment and converted to sulfonic acid type functional groups.

9. The production method for an ion exchange membrane for alkali chloride electrolysis according to claim 1, wherein the ion exchange membrane for alkali chloride electrolysis further has a layer comprising inorganic particles and a binder, on at least one outermost layer.

10. A production method for an alkali chloride electrolysis apparatus, which comprises mounting an ion exchange membrane for alkali chloride electrolysis obtained by the production method for an ion exchange membrane for alkali chloride electrolysis as defined in claim 1, in an electrolytic cell comprising a cathode and an anode, so as to partition the inside of the electrolytic cell into a cathode chamber on the cathode side and an anode chamber on the anode side.

* * * * *